Oct. 31, 1950
M. ARDITI
2,527,512
MULTIPLEX COUNTING SYSTEM
Filed Aug. 14, 1947
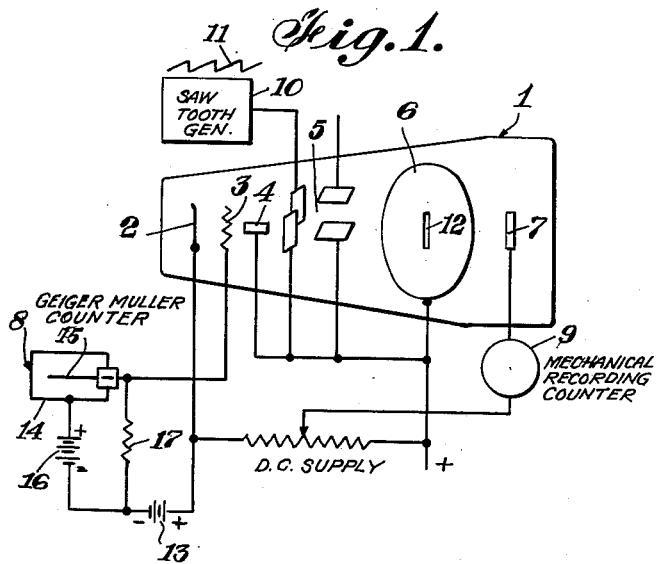
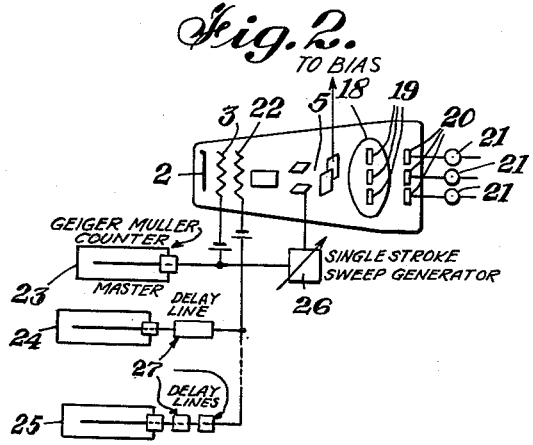
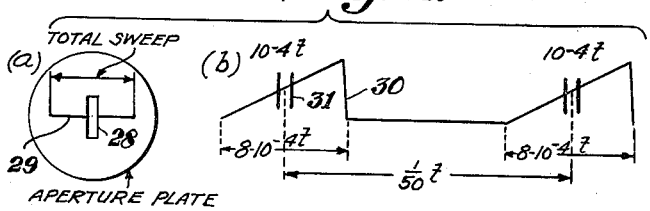
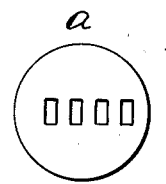
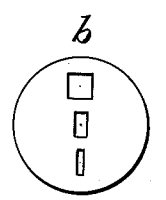
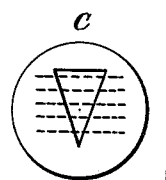
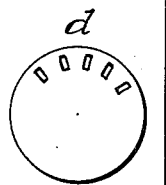
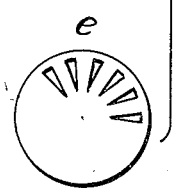
INVENTOR.
MAURICE ARDITI
BY
R. P. Morris
ATTORNEY Patented Oct. 31, 1950

2,527,512

UNITED STATES PATENT OFFICE 2,527,512

MULTIPLEX COUNTING SYSTEM

Maurice Arditi, New York, N. Y., assignor to International Standard Electric Corporation, New York, N. Y., a corporation of Delaware Application August 14, 1947, Serial No. 768,574

5 Claims. (Cl. 250—83.6)

1

This invention relates to counting circuits and more particularly to coincidence counting of nuclear particles as registered by Geiger-Muller counters.

The frequency to which a mechanical counter can respond is limited by the inertia of its moving parts. For high speed counting it is necessary to design circuits in which the relay operates once for a relatively large number of impulses. Thus, if the mechanical counter, capable of operating at a maximum frequency of 20 per second, is called upon to count only each tenth pulse, for instance, the device will be capable of counting a maximum of 200 impulses per second. In order to be able to count at high speed in applications where the phenomena to be registered are of a "random" nature such as radio-active disintegration, that is the counting of nuclear particles, which constitute a phenomenon with random fluctuations, a tube has been proposed which is similar to a cathode ray tube and which includes an apertured plate and a dynode. A Geiger-Muller counter (hereinafter referred to as a G-M counter) is placed in the grid circuit of the cathode ray tube and a mechanical recording counter in the dynode circuit. Provision is also made for a continuous and cyclical linear sweep of the electron beam across the aperture plate. When a nuclear particle or any other ionizing agent strikes the G-M counter and effects its discharge, the grid of the cathode ray tube, normally biased negatively for non-operation, receives a positive pulse with a resultant current flow through the tube. If this occurs at an instant when the beam passes through the slot in the aperture plate and strikes the dynode, the mechanical counter in the circuit will register the pulse. If the ionization of the G-M counter occurs at a time when the beam does not intercept the slot, the particle will not be registered. Over a period of time sufficiently large so that the calculus of probability could be applied, the percentage of "misses" will be substantially in the ratio of the width of the linear sweep to the width of the slot. By a proper choice of the ratio of the width of the sweep to the width of the slot, a large number of particles per second can be counted, even if the response of the mechanical counter is of the order of 20 to 60 per second. The accuracy of measurement is known according to the assumption of a random distribution. One of the problems in nuclear physics which arises at times and which has presented certain difficulties is that of coincidence counting.

It is an object of the present invention to provide a method and apparatus for counting coincidences and particularly those of nuclear particles.

It is another object to provide apparatus for counting the coincidences of nuclear particles at physically different locations.

A further object is to provide an apparatus of the type referred to which utilizes several G-M counters placed at suitable different locations making use of a single cathode ray deflection tube.

A still further object is to provide a counting circuit which employs a factor of probability in counting the number of coincidences normally beyond the capability of mechanical counters.

A still further object is to provide a counting system which is capable of registering extremely high counts.

In accordance with certain features of the invention I provide a number of G-M counters which are placed in the grid circuit of a cathode ray tube modified to include a suitable aperture plate and dynode. These G-M counters are connected to the grid in series with suitable delay lines which progressively delay the respective pulses of the various counters with respect to each other. Mechanical counters are provided in the circuit of the dynode corresponding to the slot arrangement used, which ordinarily includes a slot for each of the G-M counters. If there is a coincidence between nuclear particles affecting two or more of the G-M counters within certain predetermined time limits the mechanical counters corresponding to the respective G-M counters will provide a record; the number of coincidences are recorded on the mechanical counters following the first one which registers the total number of particles. The system lends itself to the utilization of more than two counters by the inclusion of suitable delay lines to the grid of the cathode ray tube. Miscellaneous sweep and slot arrangements may be used to accommodate counts of various characteristics in respect to the speed of counting. It will also become apparent that other than G-M detectors may be used in the coincidence counter circuit hereinafter described.

Other and further objects of the present invention will become apparent and the invention will be best understood from the following description of embodiments thereof, reference being had to the drawings, in which:

Fig. 1 is a schematic representation of a system for counting the frequency of occurrence of nuclear particles;

Fig. 2 is a schematic representation of a counting system for recording the number of coincidences of nuclear particles at various locations;

Fig. 3 is a schematic showing of various types of aperture plates for the systems of Figs. 1 and 2; and Fig. 4 is a representation of the relation of the apertured plate and the sweep of the cathode ray tube.

Referring to the drawings, the representation in Fig. 1 for counting nuclear particles, comprises a tube 1 similar to a cathode ray tube which includes a cathode 2, a control grid 3, an electron gun 4, deflection plates 5, an aperture plate 6, and a dynode 7. The G-M counter indicated at 8 is placed in the grid circuit of the cathode ray tube. The recording mechanical counter, as at 9, is provided in the dynode circuit. A suitable saw-tooth generator 10 providing a sweep of the type shown at 11, is tied to the deflection plates 5 to give a continuous linear sweep across the aperture plate 6 which is provided with a longitudinal rectangular slot 12. Normally the grid 3 of the cathode ray tube is biased negatively by means of a suitable potential supply indicated at 13, whereby current is prevented from flowing through the tube.

In case of ionization of the space between electrodes 14 and 15 of the G-M counter 8 due to the presence of an ionizing agent such as a nuclear particle, a discharge is obtained between the two electrodes 14 and 15 due to their being biased for a difference of potential by means of a source at 16 and a suitable dropping resistance 17 connected to the source 13. Such a discharge causes the grid 3 to receive a positive pulse thereby permitting current to flow through the tube. Such an impulse will be registered in the mechanical counter 9 if at that time the beam passes through the slot 12 thereby striking the dynode. No count is registered if the beam during the occurrence of the impulses on the grid 3 is outside of the confines of the slot 12.

A simple coincidence counting system is illustrated in Fig. 2. Here, a cathode ray deflection tube similar to that shown in Fig. 1 is utilized including an aperture plate 18 which is provided with a series of slots 19 which correspond to dynodes 20 associated with respective mechanical counters 21. An additional grid 22 has been provided. A series of G-M counters indicated at 23, 24 and 25 are shown, of which counter 23 is the master counter connected to the grid 3 of the tube and to deflection plates 5 thereof in series with a single stroke sweep generator 26 which may provide a variable rate of sweep as indicated by the arrow thereon. The G-M counters 24 and 25 are joined to the second grid 22 through suitable delay lines 27. The delay lines have the purpose of delaying the pulses originating at the respective G-M counters by a time interval which equals the time for travel of the cathode ray beam spot from the aperture corresponding to the first counter to the aperture corresponding to the second counter, and so forth.

In order to provide a better appreciation of the working of the counting system of Fig. 1, the relation of the sweep of the beam to the slot or slots of the aperture plate is illustrated in Fig. 4. In Fig. 4a is indicated schematically the front or viewing end of the cathode ray tube indicating at 28 a typical slot in the aperture plate, and at 29 the extent and location of travel of the beam as it impinges on the aperture plate of the tube. Practical dimensions are shown for the slot to comprise a width of 3 mm. and 25 mm. for the extent of the sweep. It is to be kept in mind that the minimum resolving time of the recording and mechanical counter each comes to about $1/50$ of a second and the minimum resolving time of the G-M counter and its associated amplifier each compromise approximately $10^{-3}$ and $10^{-4}$ seconds, necessitating, in order to avoid any "misses," that the spot should not stay in the slot more than $10^{-4}$ seconds and should not be able to return to the slot before $1/50$ of a second. This relation of the width of the sweep to the width of the slot is indicated in Fig. 4b. The sweep voltage characteristic is indicated at 30 and the relative position of the slot at 31. The ratio of multiplication in this case would be $10^4/50 = 200$. If less accuracy is permissible a smaller ratio of multiplication can be obtained by changing the sweep frequency for instance.

Greater accuracy may also be obtained by the use of several slots and several dynodes, each dynode being connected to a separate mechanical counter. Variations of such an aperture plate are shown in Fig. 3.

Different multiplication factors could be obtained in the same tube by using an aperture plate with several slots of a different aperture width as in Fig. 3b, or one slot of variable aperture width with only one dynode and one mechanical counter at as Fig. 3c, which may also be coupled to several dynodes and several mechanical counters. By using one pair of deflection plates to put the spot at different levels in the aperture plate, different degrees of sensitivity may thus be obtained.

A circular sweep could be used with several slots in the aperture plate and corresponding dynodes each with its separate mechanical counter in accordance with Fig. 3d. Different sensitivities could also be obtained with an aperture plate having slots of different aperture width along the radius as in Fig. 3e. By increasing or decreasing the radius of the circular sweep, sensitivity may be changed easily.

With reference to the coincidence counter system shown in Fig. 2, the delay line of the second counter delays the pulses coming therefrom and which are coincidental with those at the first counter by a time which is equal to that of the travel of the spot from the aperture associated with the first counter to the aperture associated with the second counter. As the grid 3 receives the positive impulse from the first counter, the count will be recorded by the first of the mechanical counters. At the same time this positive pulse will start the operation of the linear sweep generator to sweep the beam across the aperture plate. The speed of the sweep should be made such that the spot will make a complete sweep of the whole aperture plate in less than $10^{-4}$ seconds, to avoid "misses." If the number of counts is too high, high speed circuit counting of the type shown in Fig. 1 may be used. Subsequently the grid again becomes negative and the current is cut off, but after a time corresponding to the travel between two slots has elapsed, the pulses from the G-M counter 24, delayed by delay lines, will make the grid 22 positive again and the mechanical counter associated with the second slot will record the count. It is to be understood that a positive pulse applied to either grid 3 or 22 will initiate the electron beam but only a positive pulse from the first counter 23 can start operation of the switch generator. This second grid 22 has been provided so as to avoid the reactivation of the sweep generator by impulses of the G-M counters other than the first one. The number of coincidences will be recorded on the mechanical counter associated with the second slot, the first mechanical counter recording the total number of particles. Coincidence counting with more than two G-M counters may be accomplished easily by providing delay lines with increasing delays from one to the other corresponding to the time of travel of the spot from one aperture to the others. Circular sweep and several slot arrangements similar to those shown in Fig. 3 can be used. In considering a simple coincidence counting system consisting of two G-M counters, the fact should be kept in mind that a swift ionizing particle which might produce discharges in two counters would have a velocity of at least about $10^9$ cm./sec. If the counters are less than a meter apart the ionization will be produced in both within $10^{-7}$ sec of each other. Such a small interval may generally be neglected. It so happens, however, that the initiation of the discharge in a G-M counter, or the separation of the ions in an ionization chamber, occupies a finite time and it is found that impulses must be regarded as coincident if they are timed within an interval which, according to circumstances, amounts usually to one or a few microseconds.

Accordingly, while I have described above the principles of my invention in connection with specific apparatus, such as Geiger-Muller detectors and particular modifications thereof, it is to be clearly understood that other sources of impulses may be used and that this description is made only by way of example and not as a limitation on the scope of my invention.

What is claimed is:

1. A system for counting the coincidental occurrence of given phenomena on at least two spaced apart locations, comprising separate counting means corresponding to each of said locations, source of energy conversion comprising means for activating said counting means, means for controlling the successive application of energy to said counting means, means providing energy impulses for controlling the application of energy from said source to each of said counting means in response to the occurrence of a given one of said phenomena at each of said locations, and means for separating said impulses due to coincidentally occurring phenomena in respect to said separate counting means.

2. A system according to claim 1, wherein said counting means corresponding to each location comprises a mechanical recording counter having electrically energizable means for operation thereof.

3. A system according to claim 1, wherein said activating means comprises a cathode ray tube including dynode means and a corresponding aperture plate and separate output circuits therefore connected to said counting means respectively.

4. A system according to claim 1, wherein said impulse providing means includes a Geiger-Muller nuclear energy detector for each of said locations and connections therefrom to said source.

5. A system according to claim 1, wherein said separating means includes electrical delay lines means for the energy impulses of all but one of said locations and connections including said delay lines to said activating means.

MAURICE ARDITI.

REFERENCES CITED

The following references are of record in the file of this patent:

UNITED STATES PATENTS

| Number | Name | Date |
|---|---|---|
| 2,349,753 | Pontecorvo | May 23, 1944 |